United States Patent
Hodges et al.

(10) Patent No.: US 7,501,077 B1
(45) Date of Patent: Mar. 10, 2009

(54) BINDERLESS COMPOSITE SCINTILLATOR FOR NEUTRON DETECTION

(75) Inventors: Jason P. Hodges, Knoxville, TN (US); M. Lowell Crow, Jr., Oak Ridge, TN (US); Ronald G. Cooper, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 249 days.

(21) Appl. No.: 11/467,625

(22) Filed: Aug. 28, 2006

(51) Int. Cl.
*C09K 11/79* (2006.01)
*C09K 11/55* (2006.01)
*C09K 11/59* (2006.01)
*C09K 11/61* (2006.01)
*C09K 11/70* (2006.01)
*G01T 3/06* (2006.01)

(52) U.S. Cl. ............ 252/301.4 F; 252/301.4 P; 252/301.4 H; 252/646; 252/625; 252/644; 250/390.11

(58) Field of Classification Search ............ 250/390.11; 252/301.4 F, 646, 625, 644, 301.4 P, 301.4 H
See application file for complete search history.

(56) References Cited

U.S. PATENT DOCUMENTS

| | | | |
|---|---|---|---|
| 5,734,166 | A | 3/1998 | Czirr |
| 5,973,328 | A | 10/1999 | Hiller et al. |
| 6,180,946 | B1 | 1/2001 | Ebstein |
| 7,095,029 | B2 | 8/2006 | Katagiri |
| 2003/0178574 | A1* | 9/2003 | Wallace et al. .......... 250/390.11 |

* cited by examiner

*Primary Examiner*—C. Melissa Koslow
(74) *Attorney, Agent, or Firm*—Joseph A. Marasco; Kirk A. Wilson

(57) ABSTRACT

Composite scintillator material consisting of a binderless sintered mixture of a Lithium (Li) compound containing $^6$Li as the neutron converter and $Y_2SiO_5$:Ce as the scintillation phosphor, and the use of this material as a method for neutron detection. Other embodiments of the invention include various other Li compounds.

9 Claims, 3 Drawing Sheets

BINDERLESS COMPOSITE SCINTILLATOR FOR NEUTRON DETECTION

STATEMENT REGARDING FEDERALLY SPONSORED RESEARCH

This invention was made with United States Government support under Contract No. DE-AC05-00OR22725 between the United States Department of Energy and U.T. Battelle, LLC. The United States Government has certain rights in this invention.

BACKGROUND OF THE INVENTION

The current state of the art neutron inorganic scintillator for large area coverage applications is a $^6$LiF/ZnS(Ag)/polymer binder composite. In essence this is a heterogeneous mixture of $^6$Li-isotope enriched LiF for converting neutrons, silver activated ZnS scintillator and polymer binder usually formed into flat screens and mounted to suit the application. This scintillator screen is bright, produces 160,000 photons per neutron, but the material has to be thin, typically 0.45 mm or less, because of the almost opaque nature of the emulsion. The poor optical transmission property of this scintillator is due to the large difference in refractive indices between the different scintillator constituents. The neutron detection efficiency of this scintillator is directly related to the area density of $^6$Li atoms and is therefore severely restricted by the maximum scintillator thickness limit. This is especially the case for high penetration short wavelength neutrons. In addition, the scintillation response of the $^6$LiF/ZnS(Ag) is fairly slow with a decay constant of >1000 ns.

BRIEF SUMMARY OF THE INVENTION

The invention is composite scintillator material having a sintered mixture of a Lithium (Li) compound containing $^6$Li as the neutron converter and $Y_2SiO_5$:Ce as the scintillation phosphor, and the use of this material as a method for neutron detection. The $Y_2SiO_5$:Ce phosphor is referred to as P47. Other embodiments of the invention include various other Li compounds.

A neutron detection scintillator can be made by the following steps: (a) mixing at least one $^6$Li isotope enriched lithium compound selected from the group consisting of LiF, $Li_3PO_4$ and $Li_4SiO_4$ with a $Y_2SiO_5$:Ce phosphor to form a binderless mixture; and (b) sintering the mixture to form a composite scintillator. Sintering can include steps of: (a) pressing the mixture under a force to form the mixture into a pellet, (b) heating the pellet to a sintering temperature, (c) holding the pellet at sintering temperature for a predetermined period of time, and (d) cooling the pellet to room temperature.

DETAILED DESCRIPTION OF THE INVENTION

Figure 1:
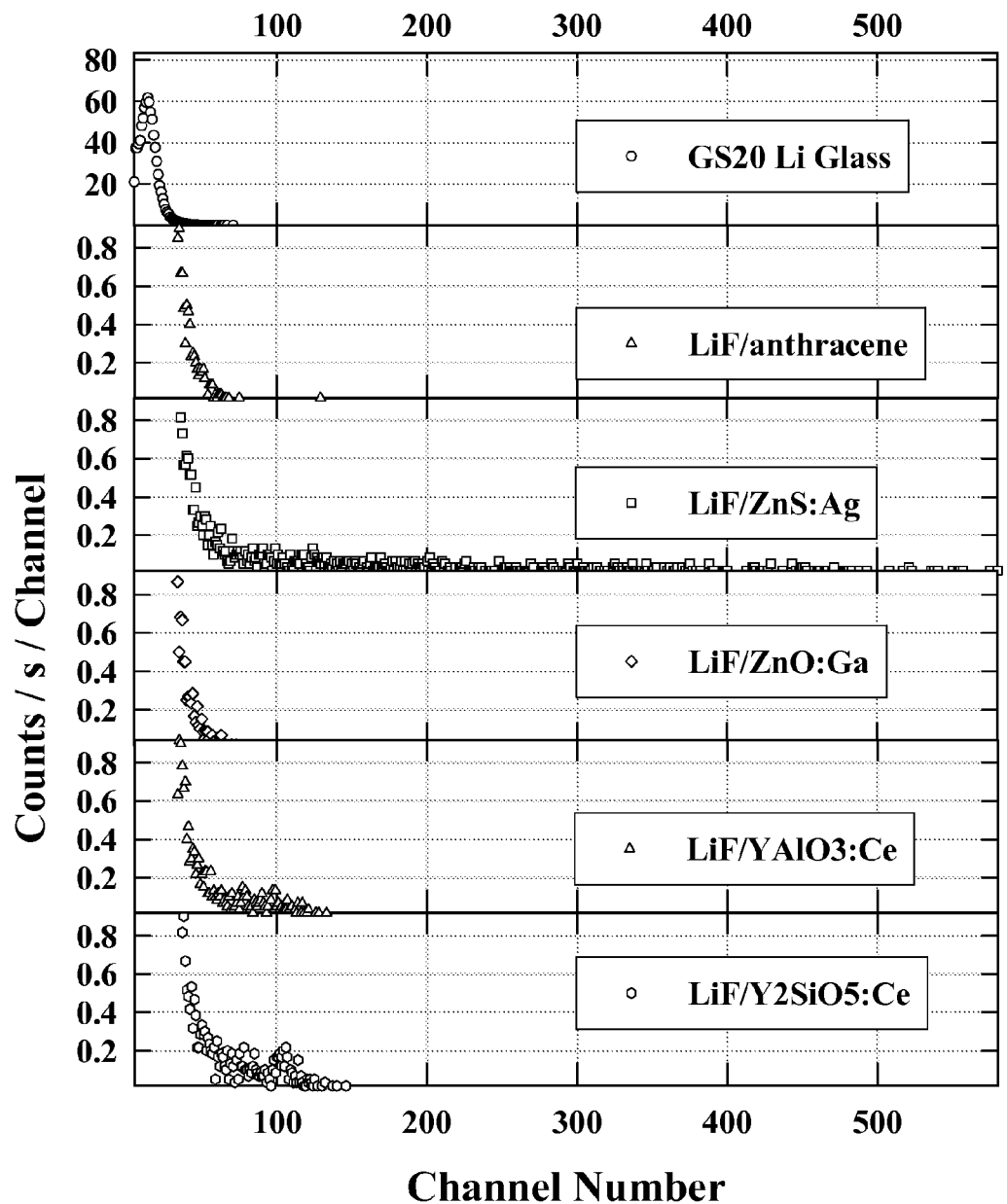
FIG. 1 is a graph showing pulse height spectra for 5 natural LiF/scintillator pressed powder mixtures shown with GS20 $^6$Li glass for comparison.

The invention comprises a series of inorganic heterogeneous composite scintillators for detecting incident epithermal and thermal neutrons (i.e. neutrons of energy 1 eV and below). The neutron detection events are both fast and bright, relative to other neutron composite scintillators.

The scintillator material is a sintered heterogeneous intimate mixture of the scintillator, yttrium silicate $Y_2SiO_5$:Ce (also called P47, a widely used commercial phosphor) with one of the following $^6$Li-containing neutron converter materials. The neutron converters that have produced a good response to incident neutrons in tested composite scintillators are lithium fluoride (LiF), lithium phosphate ($Li_3PO_4$) and a lithium fluoride—lithium phosphate eutectic (LiF:$Li_3PO_4$).

The neutron absorption of the converter component of the composite scintillators can be maximized by using a $^6$Li isotope enriched lithium source material. The ratio of scintillation phosphor to neutron converter can also be optimized to the specific application.

Preparation method: Intimately mix the P47 phosphor with an appropriate amount of lithium converter compound. Load mixed powder into a pellet die. Press powder under a force of approximately 10,000 lbs per square inch. Place pellet on platinum foil in an alumina crucible boat. Heat pellet to a set sintering temperature listed below for the different neutron converter compounds. Hold at this temperature for a short period of time, approximately 5 minutes. Cool the pellet to room temperature. The heating and cooling rates are not known to be critical. Typically a heating rate of 300° C. per hour up to 50° C. below the sintering temperature then a rate of 120° C. per hour up to the desired sintering temperature. For cooling, the inherent furnace cool rate has been used, which is approximately 200° C. per hour. The sintering time has been kept short to minimize volatilization of the lithium compound component. The heating, sintering and cooling of the pellet is best done under an inert atmosphere, e.g. flowing argon gas. This prevents oxidation of the P47 scintillator and a coloring of the composite scintillator pellet. Composite scintillator pellets prepared under a flow of argon gas were bright white under normal lighting and showed the brightest visible response to ultraviolet light from a standard UV fluorescent lamp. In addition they showed the strongest scintillation response to incident neutrons. Sintering temperature can be in the range of approximately 810° C. to 950° C. For example, sintering temperatures of 838° C., 950° C. and 810° C. have been used for the neutron converter compounds, lithium fluoride (LiF), lithium phosphate ($Li_3PO_4$) and lithium fluoride—lithium phosphate eutectic (LiF:$Li_3PO_4$), respectively.

The preparation above is one way of achieving the desired densification of the composite scintillator mixture. There are potentially many other ways this could be achieved. Application of a very high pressure would likely achieve the desired density and maybe superior scintillation properties without any application of heat. In addition all scenarios in between the two above preparation strategies are likely to work well too.

Experiments:

A number of binary mixtures of lithium compounds and scintillation phosphors have been made in an effort to find a better thermal neutron scintillator. The stoichiometrically proportioned Li compound mixtures of Table 1 were pressed into 13 mm diameter pellets using a hydraulic press. The pellets were placed in a holder with a photomultiplier tube, and the neutron response was measured using the SNS test source at the ORNL Californium User Facility. The responses were measured with the pellets exposed to the thermal neutron beam, with this beam blocked with a cadmium sheet (which strongly attenuates the thermal neutrons), and with the source port plugged, to determine the neutron response. The responses were observed using a direct view of the photomultiplier tube output on an oscilloscope and by measurement of the pulse height spectra (FIG. 1) after a time integration using a spectroscopy amplifier. While most of the samples had a small neutron response, only a few were comparable to LiF/ZnS:Ag. The most striking responses came from binary mixtures containing the P47 ($Y_2SiO_5$:Ce) phosphor.

TABLE 1

Neutron response measurements for pressed pellets of binary mixtures are shown. Integrated counts are tabulated above a constant threshold. Results for commercial $^6$LiF/ZnS:Ag and $^6$Li glass scintillators are shown for comparison (*).

| Li Compound | Scintillation Phosphor | Integrated counts/s in beam | Integrated counts/s out of beam |
|---|---|---|---|
| LiF | ZnS:Ag | 165 | 43 |
| LiF | Anthracene | 92 | 23 |
| LiF | ZnO:Ga | 81 | 30 |
| LiF | $YA_1O_3$:Ce | 100 | 28 |
| LiF | Y2SiO5:Ce (P47) | 120 | 32 |
| $Li_4SiO_4$ | ZnS:Ag | 118 | 53 |
| $Li_4SiO_4$ | Anthracene | 94 | 22 |
| $Li_4SiO_4$ | ZnO:Ga | 84 | 23 |
| $Li_4SiO_4$ | $Y_2SiO_5$:Ce (P47) | 124 | 38 |
| * $^6$LiF | ZnS:Ag (AST 2:1) | 686 | 52 |
| * Li Glass | — | 684 | 23 |

The pressed powders are not a very favorable optical form because the interfaces between the scintillator grains and the air voids scatter light strongly. The "conventional" approach with LiF/ZnS scintillator has been to use a plastic binder which also functions as a light transmission medium. A binder gives the possibility of improving the refractive index match with the scintillator, although no practical binder has been found to match the index (2.4) of ZnS. The other drawback to a binder is the reduction in scintillation efficiency because of the reduced probability that a charged particle from a neutron conversion will be stopped within a scintillator grain. We have tried a few binders with LiF/P47; the most successful so far is a standard clear acrylic paint.

TABLE 2

| Li compound | Scintillator | Sintering Temp (C.) | Counts/s | Relative Counts (a) % | Counts/s epicadmium | Relative Counts epicadmium (a) % |
|---|---|---|---|---|---|---|
| $^{nat}Li_4SiO_4$ | P47 | 950 | 0.0 | 0.0 | 0.0 | 0.0 |
| $^{nat}LiBO_2$ | P47 | 837 | 0.5 | 0.4 | 0.0 | 0.0 |
| $^{nat}LiBO_2$ | ZnS:Ag | 837 | 8.4 | 7.0 | 0.1 | 6.7 |
| $^{nat}LiBO_2$ | P47 | 840 | 0.2 | 0.0 | 0.0 | 0.0 |
| $^6Li_4F_2CO_3$ (c) | ZnS:Ag | 645 | 51.9 | 43 | 1.1 | 73 |
| $^6Li_4F_2CO_3$ (c) | P47 | 400 | 0 | 0 | 0 | 0 |
| $^{nat}LiF$ | P47 | 835 | 5.0 | 4 | 0.5 | 33 |
| $^6LiF$ | P47 | 829 | 15.1 | 12 | 2.4 | 160 |
| $^6LiF$ | P47 | 838 | 51.3 | 42 | 3.3 | 220 |
| $^6LiF$ | P47 | 843 | 62.5 | 52 | 7.2 | 480 |
| $^6LiF$ | P47 | 838 (Ar) | 91.9 | 76 | 7.8 | 520 |
| $^{nat}Li_6F_3PO_4$ (c) | P47 | 810 | 12.3 (d) | 10 | 3.3 | 220 |
| $^6LiF$ | ZnS:Ag | (b) | 121 | 100 | 1.5 | 100 |

Neutron response measurements for sintered pellets are shown.
Integrated counts are tabulated above a constant threshold.
(a) The Relative Count Rate is a comparison to the AST $^6$LiF:ZnS(Ag) screen, which showed 121 and 1.5 counts/s with and without Cadmium filter respectively.
(b) $^6$LiF/ZnS:Ag 2:1 screen with binder from Applied Scintillation Technologies, for reference.
(c) Eutectic.
(d) Compare count rate with $^{nat}$LiF/P47.

Figure 2:
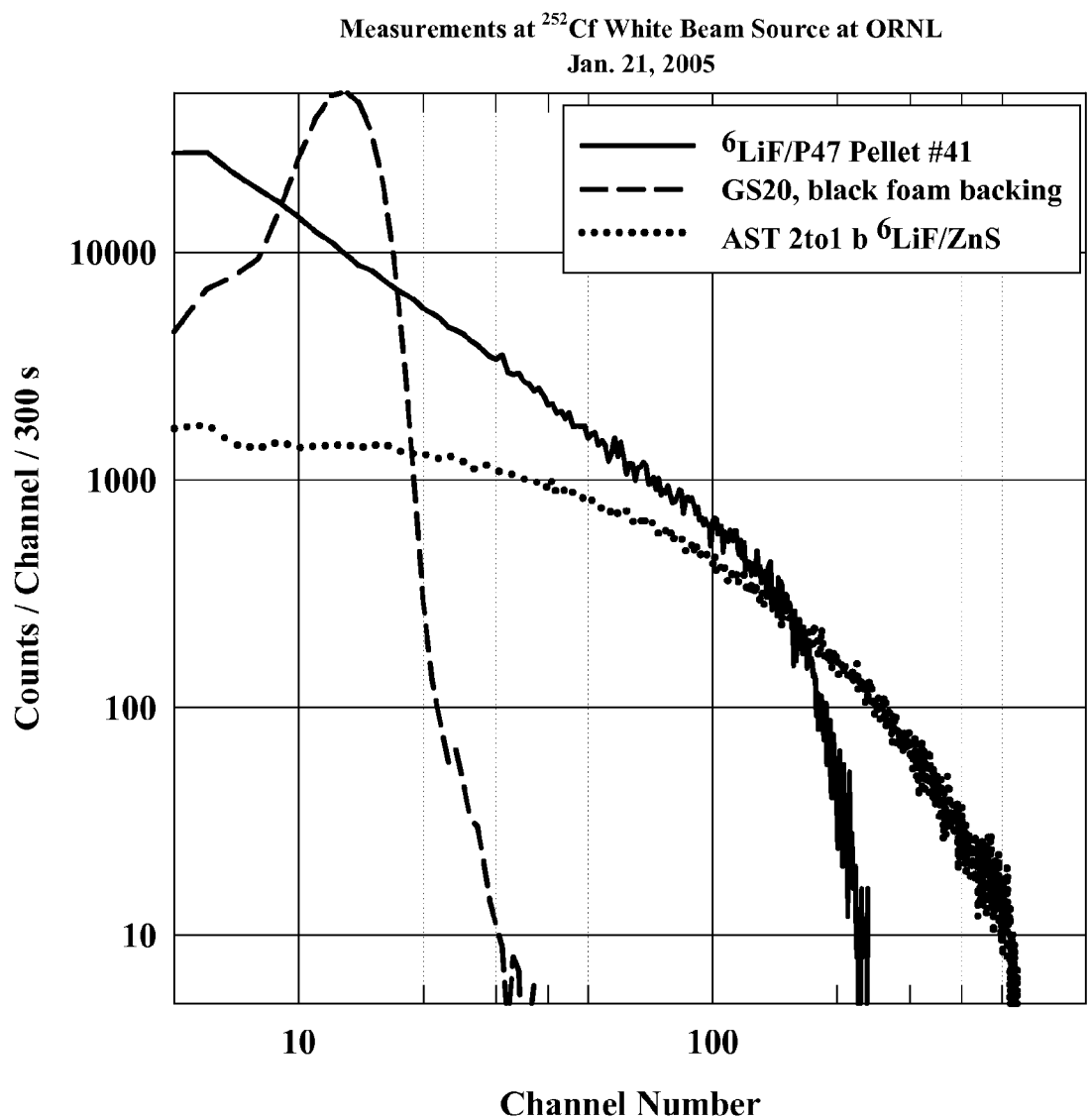
FIG. 2 is a logarithmic graph showing the pulse height spectrum from a sintered $^6$LiF/P47 pellets under neutron irradiation, with similar spectra from commercial GS20 $^6$Li glass and $^6$LiF/ZnS:Ag samples for comparison.

An alternative approach is to avoid the binder and attempt to fill the space between scintillator grains with Li-containing converter material. Most of the Li compounds we have considered have lower melting points than either ZnS or P47, so that possibilities of melt forming, hot pressing, or sintering can be examined. Sintering of the pressed pellets avoids the problem of material separation. Table 2 lists some of the ZnS and P47 pellets sintered and tested to date. For this table, the threshold for the pulse height integral is set at a level higher than in Table 1, and the scintillator is in a lower flux position. The epicadmium rate is also recorded in this table. In some combinations, notably with $Li_2CO_3$ and $Li_2SiO_4$, there has been a chemical reaction with the P47 which degraded the scintillation properties. In others, however, especially LiF and $Li_3PO_4$, there has been an increase in transparency which has led to a larger number of high light yield events. The sintered enriched $^6$LiF/P47 samples already approach useful detection efficiencies and have light output comparable to commercial scintillators (FIG. 2). The natural $Li_6F_3PO_4$-eutectic/P47 sample is surprisingly good for a material with no isotopic enrichment.

Figure 3:
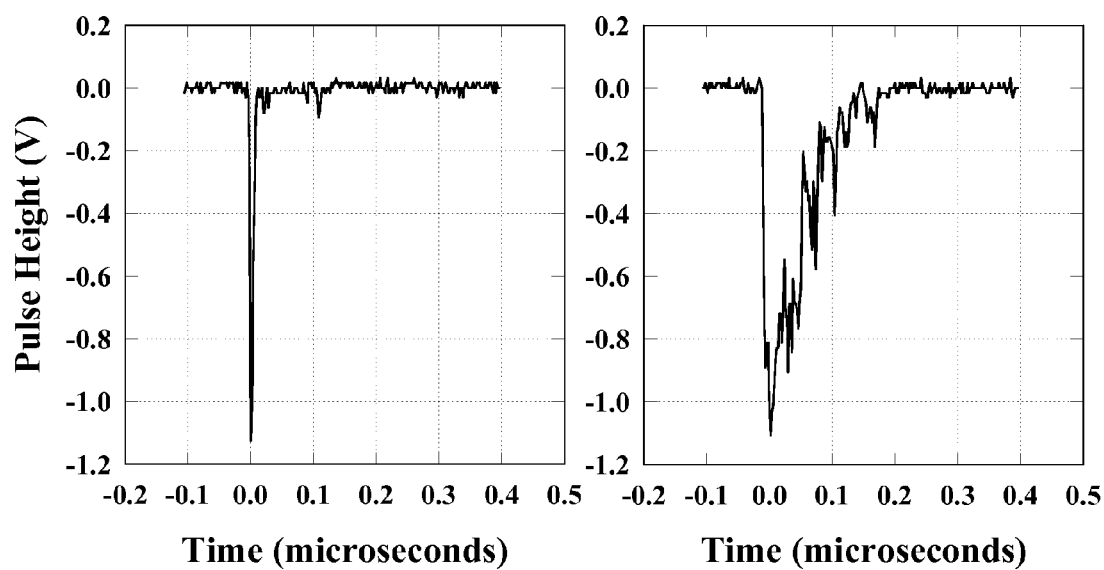
FIG. 3 are two typical pulse patterns indicating photons emitted from $^6$LiF/P47 under neutron irradiation, detected using the photomultiplier tube. The rate for the larger pulses on the right is greatly reduced if the neutron source is blocked.

Two distinct pulse shapes are observed from LiF/P47 (FIG. 3). Almost all of the large pulses associated with the peak pulse height have the longer time scale. In addition, the longer pulses become much less frequent when the scintillator is moved away from the neutron source. Therefore, there is a strong possibility that pulse shape discrimination between neutron and gamma-ray signals can be achieved, but on a much shorter time scale than is possible with LiF/ZnS.

While there has been shown and described what are at present considered the preferred embodiments of the invention, it will be obvious to those skilled in the art that various changes and modifications can be made therein without departing from the scope.

We claim:
1. A composite scintillator comprising;
   a binderless sintered mixture of at least one $^6$Li isotope enriched lithium compound selected from the group consisting of LiF, $Li_3PO_4$ and $Li_4SiO_4$, and $Y_2SiO_5$:Ce phosphor, and
   wherein said scintillator detects neutrons.
2. The scintillator of claim 1 wherein said at least one $^6$Li isotope enriched lithium compound includes a eutectic mixture of LiF and $Li_3PO_4$.
3. A method for producing a neutron detection scintillator comprising the steps of:
   (a) mixing at least one $^6$Li isotope enriched lithium compound selected from the group consisting of LiF, $Li_3PO_4$ and $Li_4SiO_4$ with a $Y_2SiO_5$:Ce phosphor to form a binderless mixture; and
   (b) sintering the mixture to form a composite scintillator.
4. The method of claim 3 wherein said sintering step is done in an inert atmosphere.
5. The method of claim 3 wherein said sintering step further comprises:
   (a) pressing said mixture under a force to form said mixture into a pellet,
   (b) heating said pellet to a sintering temperature,
   (c) holding said pellet at said sintering temperature for a predetermined period of time, and
   (d) cooling said pellet to room temperature.
6. The method of claim 5 wherein said force is approximately 10,000 lbs per square inch.
7. The method of claim 5 wherein said sintering temperature is in the range of approximately 810° C. to 950° C.
8. The method of claim 5 wherein said predetermined period of time is approximately 5 minutes.
9. The method of claim 3 wherein said at least one $^6$Li isotope enriched lithium compound is includes a eutectic mixture of LiF and $Li_3PO_4$.

* * * * *